July 7, 1959
C. W. PILCH
2,893,741
POULTRY FEEDING APPARATUS OR THE LIKE
Filed June 16, 1955
2 Sheets-Sheet 1
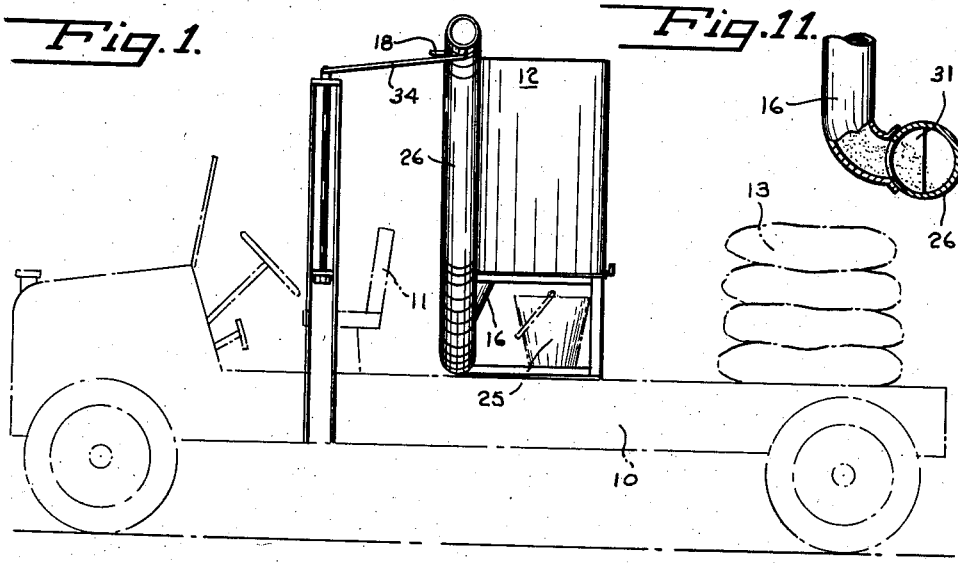
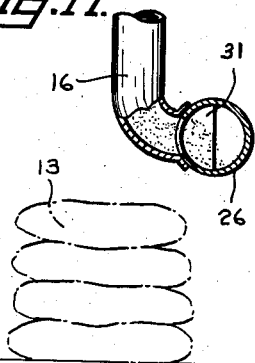
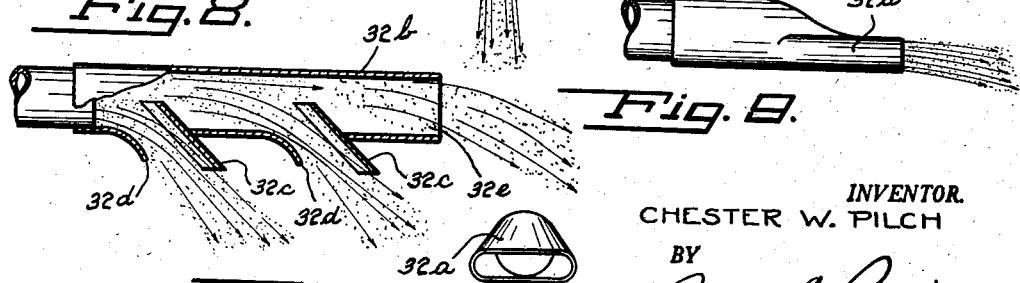
INVENTOR.
CHESTER W. PILCH
BY
Raymond A. Paquin
ATTORNEY.

July 7, 1959
C. W. PILCH
2,893,741
POULTRY FEEDING APPARATUS OR THE LIKE
Filed June 16, 1955
2 Sheets-Sheet 2
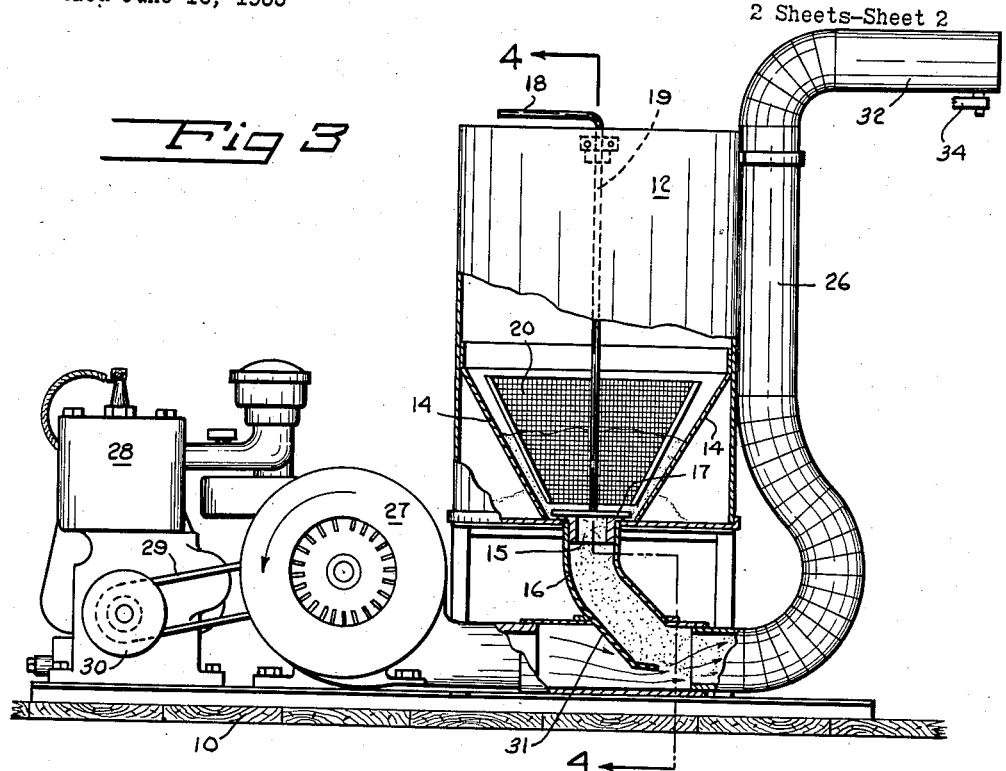
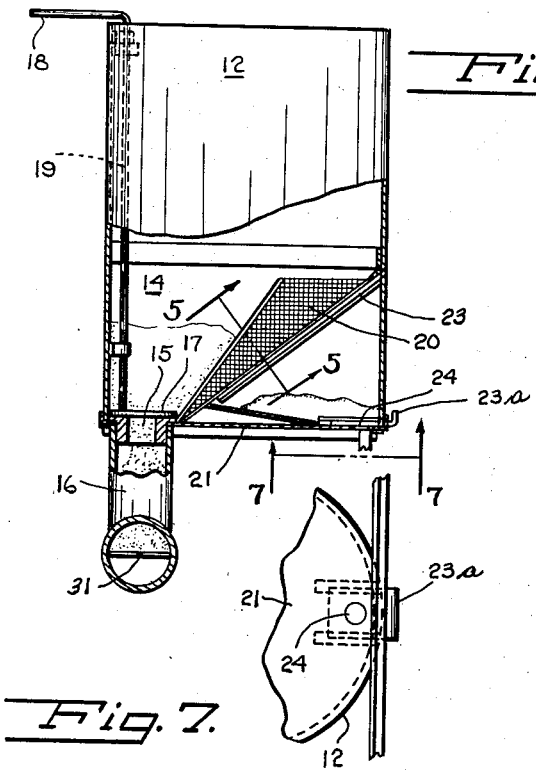
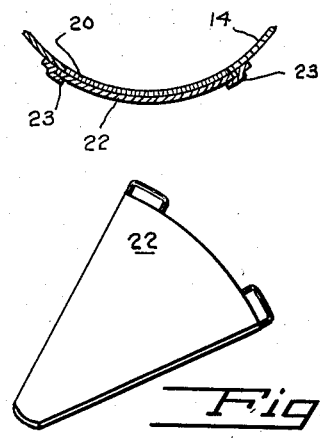
INVENTOR.
CHESTER W. PILCH
BY
*Raymond A. Paquin*
ATTORNEY.

United States Patent Office 2,893,741
Patented July 7, 1959

2,893,741

POULTRY FEEDING APPARATUS OR THE LIKE

Chester W. Pilch, Hazardville, Conn.

Application June 16, 1955, Serial No. 515,963

4 Claims. (Cl. 275—2)

This invention relates to apparatus for feeding poultry or the like and has particular reference to a new and improved apparatus whereby the feeding of poultry in a range is simplified and facilitated without danger of injury to the poultry during feeding.

An object of the invention is to provide a new and improved poultry feeding apparatus or the like for feeding poultry in a range without the necessity of entering the range and thereby eliminating the possibility of injury to the poultry, and whereby the feed may be distributed over any desired portion of the range.

Another object is to provide a poultry feeding apparatus or the like which reduces to a minimum the manpower required and yet speeds up the feeding operation.

Other objects and advantages of the invention will be apparent from the following description taken in connection with the accompanying claims. It will be understood that changes may be made in the details of construction and arrangement of parts shown and described without departing from the scope of the invention as set forth in the accompanying claims, as the preferred form has been given by way of illustration only.

Referring to the drawings:

Fig. 1 is a side view showing a form of apparatus embodying the invention mounted on a truck;

Fig. 2 is a top or plan view of the apparatus shown in Fig. 1;

Fig. 3 is a front view of the apparatus;

Fig. 4 is a sectional view taken on line 4—4 of Fig. 3, looking in the direction of the arrows;

Fig. 5 is a fragmentary sectional view taken on line 5—5 of Fig. 4, looking in the direction of the arrows;

Fig. 6 is a top view of the closure member shown in Fig. 5;

Fig. 7 is a fragmentary view taken on line 7—7 of Fig. 4, looking in the direction of the arrows;

Fig. 8 is a sectional view of one form of distributing nozzle;

Fig. 9 is a side view of another form of distributing nozzle;

Fig. 10 is an end view of the nozzle shown in Fig. 9; and

Fig. 11 is a fragmentary view showing a modified form of the invention.

In the range feeding of poultry in the past, it has been customary to drive a truck or other vehicle into the range and spread the feed by hand from the vehicle. This procedure required an operator for the vehicle and an assistant to open and close the gates of the ranges and to distribute the feed and also to try to keep the poultry from being injured by the vehicle to which they were attracted by the habit of receiving their feed from it.

In spite of the assistant, a large number of poultry were run over by the vehicle.

It is, therefore, the principal object of the invention to provide new and improved apparatus for feeding poultry or the like which eliminates the necessity of driving into the range and, also, the possibility of injury to the poultry, and allows the complete feeding to be carried on by the vehicle operator thereby eliminating the necessity of an assistant and also allows improved control of the distribution of the feed in the range.

Referring more particularly to the drawings wherein similar reference characters designate corresponding parts throughout, the apparatus shown embodying the invention comprises a truck or other similar type vehicle which has the body 10 and the usual operator's seat 11.

On the body 10 is positioned a hopper or other container 12 for the feed, a supply of which may be carried in the sacks 13 and which may be emptied into hopper 12.

The feed may be grain, pellets or other forms, as desired.

The hopper 12 has the sloped walls 14 adjacent its lower end whereby the feed will descend by gravity through passage or opening 15 into pipe 16.

Passage or opening 15 is controlled by valve 17 which may be actuated by the vehicle operator through handle 18 on actuating lever 19 which is connected to valve 17 for controlling the position of the valve and thereby controlling the passage of feed from the hopper 12.

In the bottom wall of hopper 12 is provided screen 20 which is spaced from the bottom 21 of hopper 12 and shoe 22 is adapted to fit into slide 23 to close the screen when grain is being fed and by removing shoe 22 when pellets are being fed, the fines or pulverized portions of the feed will pass through screen 20 into the compartment beneath the screen on bottom wall 21 and by withdrawing slide member 23a, this pulverized material will pass through opening 24 into a pail or other container 25 which may be positioned beneath the bottom of the hopper 12.

Hopper 12 communicates through opening 15 and pipe 16 with conduit member 26 through which air is blown by fan blower 27 which is adapted to be driven by a suitable source of power such as the internal combustion engine 28 which is operatively connected to fan blower 27 by belt drive 29 and through pulleys 30, or other suitable connections the speed of fan blower 27 may be controlled.

If desired, other forms of motor and drive means may be employed for operating fan blower 27, such as a motor directly associated with the fan blower.

Conduit member 26 may be supported by an adjustable boom carried on the vehicle, if desired.

Adjacent the connection of pipe or passage member 16 and conduit member 26 is provided the baffle 31 to prevent blowing of air into pipe 16 and hopper 12.

The conduit member 26 may be of desired cross section and configuration but, preferably, has its outer end or nozzle 32 directed outwardly from a side of the vehicle and adjustable relative to the vehicle with such angular adjustment adapted to be controlled by the operator at will by means of handle 33 adjacent the operator's seat 11 and which handle is connected through suitable levers 34 to nozzle 32, whereby the nozzle may be adjusted at will to direct the feed to desired portions of the range. This angular adjustment is illustrated in broken lines in Fig. 2.

The outer end or nozzle 32 of conduit member 26 may be of various types depending upon the area of the range to be covered.

In Fig. 2, this nozzle or outer end 32 is shown to be merely the end of the conduit member which may be suitable for general purposes.

To distribute the feed a greater distance from the fence 35, the nozzle may be formed with a reduced or flattened end 32a as shown in Figs. 9 and 10.

To obtain a wide range of distribution of the feed, a nozzle 32b may be employed which is adapted to be secured to the end of member 26 and has the deflectors 32c and openings 32d as well as the open end 32e for obtaining wide distribution.

In the arrangement shown in Fig. 3, the pipe 16 extends into conduit member 26 from the top, that is, it is a top feeding arrangement. If desired, as shown in Fig. 11, pipe 16 may extend into a side of conduit member 26.

In operation, feed is placed into hopper 12 from sacks 13 and motor 28 started.

The vehicle is then driven along the fence 35 of the range into which the feed is to be delivered with the end 32 of conduit member directed toward the range and then by opening valve 12 through handle 18, as previously described, the air blown through conduit 26 will draw feed from hopper 12 through passage 15 and pipe 16 and distribute such feed over areas of the range as controlled by the direction of nozzle 32 and the speed of fan blower 27.

One method that has been found advantageous is to change the speed of fan 27 and amount of feed for a few days or a week whereby during those days, the feeding will take place over an area adjacent the fence and for the next few days or week, a predetermined distance away from the fence.

From the foregoing, it will be seen that I have provided new and improved means for obtaining all of the objects and advantages of the invention.

I claim:

1. In a device to distribute granular material, a vehicle having a self contained source of power for actuation of said vehicle, a hopper carried by said vehicle, a conduit member having a portion extending beneath said hopper and connected to said hopper, said conduit member having an elevated nozzle portion directed laterally of said vehicle whereby material delivered through said conduit may be distributed from an elevated position generally horizontally into a poultry range while the vehicle is moving along a fence forming a boundary for said range, said conduit member having its end portion adjustable in a horizontal plane whereby the lateral direction of said conduit may be varied, and control means adjacent the position of the vehicle operator and operatively connected to said adjustable end of said conduit member whereby the lateral direction of said adjustable end portion of said conduit member may be varied by the vehicle operator without leaving his position for operation of the vehicle, adjustable valve means in said hopper bottom to control flow of granular material from said hopper to said conduit member, a screen in the wall of said hopper for eliminating finely pulverized materials from said hopper and means for controlling the passage of finely pulverized materials from said hopper through said screen, blower mounted on said vehicle constructed and arranged so as to blow air through said conduit member for effecting the passage of material from said hopper through said conduit member and variable speed motive means for effecting operation of said blower.

2. In a device to distribute granular material, a vehicle having a self contained source of power for actuation of said vehicle, a hopper carried by said vehicle, a conduit member extending beneath said hopper and connected to said hopper, an adjustable valve means in said hopper bottom to control the flow of granular material from said hopper to said conduit member, and directed laterally of said vehicle whereby granular material delivered through said conduit may be distributed generally laterally of said vehicle into a poultry range while the vehicle is moving parallel to a fence forming a boundary for said range, said conduit member having its end portion adjustable in a horizontal plane whereby the lateral direction of said conduit may be varied, and control means adjacent the position of the vehicle operator and operatively connected to said adjustable end of said conduit member whereby the lateral direction of said adjustable end portion of said conduit member may be varied by the vehicle operator without leaving his position while operating the vehicle, a blower mounted on said vehicle discharging air into said conduit member for effecting the passage of material from said hopper through said conduit member and motive means for effecting operation of said blower, a screen in a wall of said hopper for the elimination of finely pulverized materials from said hopper and means for controlling the passage of finely pulverized materials from said hopper through said screen.

3. In a device to distribute granular material such as chicken feed, or the like, a vehicle having a self contained source of power for actuation of said vehicle, a hopper carried by said vehicle, a conduit member extending beneath said hopper and connected to said hopper, one end of said conduit member being elevated and terminating in nozzle means directed generally laterally of said vehicle whereby material delivered through said conduit may be distributed into a poultry range from an elevated position while the vehicle is moving along a fence forming a boundary for said range, said conduit member having its end portion adjustable in a horizontal plane whereby the lateral direction of said conduit may be varied, and control means adjacent the position of the vehicle operator and operatively connected to said adjustable end of said conduit member whereby the lateral direction of said adjustable end portion of said conduit member may be varied by the vehicle operator without leaving his position while operating the vehicle, a screen in the wall of said hopper for eliminating finely pulverized materials from said hopper and means for controlling the passage of finely pulverized materials from said hopper through said screen, a blower mounted on said vehicle arranged to produce a flow of air in said conduit member for effecting the passage of material from said hopper through said conduit member and motive means for effecting operation of said blower, auxiliary passage means in the side wall of said nozzle means and deflector means extending through said auxiliary passage means for increasing the area of distribution of the granular materials in the range.

4. In a device to distribute granular material, such as chicken feed or the like, a vehicle having a self contained source of power for actuation of said vehicle, a hopper carried by said vehicle, a conduit member extending beneath said hopper connected to said hopper and having an elevated end portion terminating in a nozzle directed generally laterally of said vehicle whereby material delivered through said conduit may be distributed from an elevated position into a poultry range while the vehicle is moving along a fence forming a boundary for said range, said conduit member having its nozzle portion adjustable in a horizontal plane whereby the lateral direction of delivery may be varied, and control means adjacent the position of the vehicle operator and operatively connected to said adjustable nozzle whereby the lateral direction of said nozzle portion of said conduit member may be varied by the vehicle operator without leaving his position while operating the vehicle, a blower mounted on said vehicle discharging air into said conduit member for effecting the passage of material from said hopper through said conduit member and motive means for effecting operation of said blower, a screen in a wall of said hopper for eliminating finely pulverized materials from said hopper and means for controlling the passage of finely pulverized materials from said hopper through said screen, auxiliary passage means in the side wall of said nozzle portion and deflector means extending through said auxiliary passage means for increasing the area of distribution of the granular materials in the range.

References Cited in the file of this patent

UNITED STATES PATENTS

| | | |
|---|---|---|
| 463,708 | Williams et al. | Nov. 24, 1891 |
| 559,196 | Norris | Apr. 28, 1896 |
| 1,240,409 | Black | Sept. 18, 1917 |
| 1,529,219 | Schaab | Mar. 10, 1925 |
| 1,681,877 | Pounds et al. | Aug. 21, 1928 |
| 1,783,127 | McCormick | Nov. 30, 1928 |
| 1,987,656 | Althouse et al. | Jan. 15, 1935 |
| 2,295,472 | Hopkins | Sept. 8, 1942 |
| 2,409,270 | Glessner | Oct. 15, 1946 |